United States Patent
Forster (10) Patent No.: US 12,248,838 B2
(45) Date of Patent: Mar. 11, 2025

(54) FILTERING SYSTEMS FOR RECYCLING RFID TAGS AND METHODS OF USING THEREOF

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/758,035

(22) PCT Filed: Dec. 28, 2020

(86) PCT No.: PCT/US2020/067171
§ 371 (c)(1),
(2) Date: Jun. 27, 2022

(87) PCT Pub. No.: WO2021/134067
PCT Pub. Date: Jul. 1, 2021

(65) Prior Publication Data
US 2023/0054777 A1 Feb. 23, 2023

Related U.S. Application Data

(60) Provisional application No. 62/954,459, filed on Dec. 28, 2019.

(51) Int. Cl.
*G06K 7/10* (2006.01)
(52) U.S. Cl.
CPC ................ *G06K 7/10366* (2013.01)
(58) Field of Classification Search
CPC .................................................. G06K 7/10366
See application file for complete search history.

(56) References Cited

U.S. PATENT DOCUMENTS

| 6,131,744 A | 10/2000 | Pratt |
| 11,664,577 B2 * | 5/2023 | Forster ............... G09F 3/0297 340/572.7 |

(Continued)

FOREIGN PATENT DOCUMENTS

| JP | 2005-161754 | 6/2005 |
| JP | 2006-196723 | 7/2006 |

(Continued)

OTHER PUBLICATIONS

International Search Report and Written Opinion dated Apr. 29, 2021 issued in corresponding IA No. PCT/US2020/067171 filed Dec. 28, 2020.

(Continued)

*Primary Examiner* — Sonji N Johnson (57) ABSTRACT

A recyclable RFID device having one or more recoverable components configured to remain substantially intact during a waste recycling process. The one or more recoverable components comprises a RFID coupling strap and a substrate encapsulating the RFID coupling strap. A filtering system for recovering the recyclable RFID device from a waste stream is also disclosed, and comprises a waste collection container, a RFID device detection unit, and a RFID device diversion area. Additionally, a filtering system for recovering the recyclable RFID device during a waste recycling process is disclosed. The filtering system enables separating the recyclable RFID device from a packaging and detecting the separated components of the recyclable RFID device including the one or more recoverable components. The separated components including the RFID chip is then diverted from the waste stream for reuse.

10 Claims, 8 Drawing Sheets

(56) References Cited

U.S. PATENT DOCUMENTS

| | | | |
|---|---|---|---|
| 2006/0080819 A1* | 4/2006 | McAllister | G06K 17/00 |
| | | | 29/403.3 |
| 2006/0080891 A1 | 4/2006 | Ghosh et al. | |
| 2006/0125636 A1 | 6/2006 | Nishida et al. | |
| 2007/0241887 A1* | 10/2007 | Bertagna | G01S 5/0027 |
| | | | 340/573.6 |
| 2008/0061124 A1 | 3/2008 | Langlois et al. | |
| 2008/0084313 A1* | 4/2008 | Seidel | G06K 19/077 |
| | | | 340/572.9 |
| 2009/0002134 A1* | 1/2009 | McAllister | G06K 19/07749 |
| | | | 340/10.51 |
| 2009/0224918 A1 | 9/2009 | Copeland | |
| 2011/0155813 A1* | 6/2011 | Forster | G06K 19/07752 |
| | | | 235/492 |
| 2020/0119428 A1* | 4/2020 | Forster | G09F 3/0297 |
| 2020/0160137 A1 | 5/2020 | Melo et al. | |
| 2023/0054777 A1* | 2/2023 | Forster | G06K 7/10009 |

FOREIGN PATENT DOCUMENTS

| | | |
|---|---|---|
| JP | 2006-231193 | 9/2006 |
| JP | 2007-249725 | 9/2007 |
| JP | 2014-110019 | 6/2014 |
| WO | 2004/065029 | 8/2004 |

OTHER PUBLICATIONS

International Preliminary Report on Patentability dated Jun. 28, 2022 issued in corresponding IA No. PCT/US2020/067171 filed Dec. 28, 2020.

* cited by examiner

FILTERING SYSTEMS FOR RECYCLING RFID TAGS AND METHODS OF USING THEREOF

CROSS-REFERENCE TO RELATED APPLICATION

The present application is a 371 of International Application No. PCT/US2020/067171, which was published in English on Jul. 1, 2021, and claims the benefit of U.S. Provisional Patent Application No. 62/954,459 filed Dec. 28, 2019, both of which are incorporated herein by reference in their entireties.

FIELD

The present invention relates generally to a recyclable radio-frequency identification (RFID) device such as a RFID tag, a filtering system for separating the recyclable RFID device from the associated packaging, and a method of using the filtering system to recover one or more components of the recyclable RFID device. More specifically, the recyclable RFID device is configured to remain substantially intact and recoverable during a waste recycling process for reuse, and the filtering system is designed to separate the recyclable RFID device from associated waste packaging during a waste recycling process.

BACKGROUND

Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track. In some cases, the RFID tag may be attached to the outside of the article with a clip, adhesive, tape, or other means and, in other cases, the RFID tag may be inserted within the article, such as being included in the packaging, located within the container of the article or plurality of articles, or sewn into a garment. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database.

These RFID devices generally include a combination of antennas and analog and/or digital electronics, such as communications electronics, data memory, and control logic, as well as structures to support and protect the antennas and electronics, and to mount or attach the same to an object. For example, RFID labels are RFID devices that are adhesively attached to an object as part of a printed label with printed matter on one side, or are otherwise attached directly to said objects.

All RFID devices are typically designed with certain parameters in mind. For example, in most applications, the size and the shape (that is, the form factor) of the RFID device is crucial, as are other properties such as the flexibility of the device. For various reasons, such as security, aesthetics, manufacturing efficiency, and so forth, there is a very strong tendency on the part of RFID manufacturers to make use of smaller form factors. As such, and because relatively thin profiles and flexibility are so commonly desired, it is important to avoid materials such as bulky electronics and RFID device constructions that add undue thickness or stiffness to the RFID tag or label.

RFID devices most commonly include, as primary components, a very small and flexible chip, and a flexible dipole antenna that has a physical length of approximately one-half wavelength of the RF device's operating frequency. The chips and the antennas may be linked with structures referred to as "straps," "interposers," and "carriers," to facilitate device manufacture. For purposes of discussion, said straps, interposers and carriers are hereinafter collectively referred to as "straps".

These straps may function as electrical interfaces for routing between a connection associated with the chip and a connection associated with the antenna. The straps may comprise conductive leads or pads that are electrically coupled to the contact pads of the chips for coupling to the antennas. These conductive leads or pads may be used to provide a larger effective electrical contact area than a chip precisely aligned for direct placement would have without the use of a strap or interposer. Having a larger effective electrical contact area reduces the accuracy required for placement of chips during manufacture, while still providing effective electrical connection between the antenna and the chip. The use of such a device can be extremely helpful during manufacturing, as chip placement and mounting are historic constraints for high-speed manufacturing, but can also result in more material being consumed during the manufacturing process, which increases manufacturing costs and is therefore undesirable.

Furthermore, there is a current desire within the RFID industry for more recyclables, which is being driven by a new level of consciousness related to preserving resources and the environment. Retailers and brand owners, in an effort to satisfy the demands of customers, have begun seeking new ways to respond to customer requests as well as delivering an impactful way of maintaining the brand integrity while still lowering supply chain costs. As RFID tags are generally more expensive that other tracking options, such as bar codes, they add to the overall cost of tracking and shipping a product.

One such difficulty with RFID devices is that they are generally not disposable. Nonetheless, RFID labels are now commonly attached to recyclable materials such as cardboard cartons, plastic bottles, fabric items, and the like. However, RFID labels are typically not entirely recyclable. While the antenna component, frequently made of a conductive material such as copper, silver, or aluminum may be recyclable, the RFID chip, typically made of non-recyclable material, is not. The RFID chip is one of the most expensive parts of label construction. For both cost and environmental reasons, it would be beneficial to be able to recover and re-use portions of the RFID label (e.g., the RFID chip) when the product or packaging to which it is attached is recycled.

In a typical waste chain involving recycling of product packaging secured with RFID labels, the product or packaging is collected after disposal, and processed in a waste recycling facility. The waste recycling facility breaks down the product or packaging into a reusable product, such as paper pulp or plastic pellets. The RFID chip made of non-recyclable material is either incorporated into the output material, acting as a contaminant reducing the value of the output material, or it is separately disposed of as non-recyclable waste at an additional cost.

Therefore, there exists in the art a long felt need for a recyclable RFID device having one or more recoverable components that can be recovered from a recycling operation. There also exists a long felt need in the art for a filtering system configured to recover one or more components of the recyclable RFID device, and a method of recovering parts of the recyclable RFID device.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Recyclable RFID devices, filtering systems for recycling such devices, and methods of using the systems to recycle such devices are described herein. The recyclable RFID device preferably contains a small recoverable component configured to function in conjunction with a recyclable antenna.

In one embodiment, the small recoverable component of the recyclable RFID device contains a RFID coupling strap. In some embodiments, a substrate encapsulates the RFID coupling strap. In some embodiments, the RFID coupling strap is a near-field strap containing a conductor coupled to a RFID chip. The conductor may contain a loop conductor, and is dimensioned as small as possible to resist destruction from a mechanical recycling motion, such as stirring, pulping or the like. Furthermore, when the RFID device is attached to the packaging, it is placed near an antenna to form a far-field RFID device. In some embodiments, the substrate encapsulating the RFID coupling strap may be manufactured from a compressible material that may move between an uncompressed state and a compressed state.

In some embodiments, a recyclable RFID device contains a RFID coupling strap and a substrate encapsulating the RFID coupling strap. In some embodiments, the RFID coupling strap contains a multi-turn conductor and a RFID chip, wherein the multi-turn conductor comprises both an inner end and an outer end. The RFID coupling strap further contains a bridge conductor component, wherein the bridge conductor component connects both the inner end and the outer end of the multi-turn conductor to the RFID chip.

In some embodiments, a recyclable RFID device contains a RFID coupling strap and a substrate encapsulating the RFID coupling strap. In some embodiments, the RFID coupling strap contains a conductor coupled to a RFID chip, wherein the conductor may contain a loop conductor. The RFID coupling strap further contain a high magnetic permeability element that is positioned within a diameter of the loop conductor.

In yet another embodiment, a recyclable RFID device contains a RFID chip, a RFID coupling strap, and a substrate encapsulating the RFID coupling strap. In some embodiments, the RFID coupling strap contains a conductor coupled to the RFID chip, wherein the conductor may contain a loop conductor, and a magnetic element positioned near the conductor and also coupled to the RFID chip.

In one embodiment, a RFID coupling strap encapsulated by a substrate is magnetically coupled to an antenna of the recyclable RFID device.

In another embodiment, a RFID coupling strap encapsulated by a substrate is capacitively coupled to an antenna of the recyclable RFID device.

In yet another embodiment, a RFID coupling strap encapsulated by a substrate is conductively coupled to an antenna of the recyclable RFID device.

Filtering systems for recovering one or more recoverable components of a recyclable RFID device attached to a packaging from a waste stream are also described herein. In some embodiments, the system contains a waste collection container, a RFID device detection unit, and a RFID diversion area. In some embodiments, the recyclable RFID device attachable to a packaging contains a small recoverable component. In one embodiment, the small recoverable component includes a RFID coupling strap, a RFID chip attached to the RFID coupling strap and a substrate encapsulating the RFID coupling strap. The RFID coupling strap comprises a conductor coupled to the RFID chip. In some embodiments, the recyclable RFID device entering into the waste collection container along with the associated packaging is separated from the associated packaging within the container. Once separated from the packaging, the recyclable RFID device is detected by the RFID device detection unit. In one embodiment, the RFID device detection unit contains a RFID detector and an antenna for detecting the recyclable RFID device.

In some embodiments, the filtering system contains a RFID device removal unit for removing/separating the detected recyclable RFID device from the waste stream. In some embodiments, the separated recyclable RFID device is selectively diverted and sent to a RFID diversion area of the filtering system. The small recoverable component of the recyclable RFID device including the RFID coupling strap containing the RFID chip is recovered at the end of the filtering process. The recovered component may be returned to the RFID label manufacturer for reuse.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The invention is now described with reference to the drawings, wherein like reference numerals are used to refer to like elements throughout. In the following description, for purposes of explanation, numerous specific details are set forth in order to provide a thorough understanding thereof. It may be evident, however, that the invention can be practiced without these specific details. In other instances, well-known structures and devices are shown in block diagram form in order to facilitate a description thereof.

As noted above, there exists in the art a long felt need for a recyclable RFID tag or device for use with a product or packaging, wherein at least one or more components of the recyclable RFID device being recoverable when the product or packaging is recycled. As the RFID chip is one of the most expensive components of a RFID device, it would be beneficial to be able to isolate and recover the RFID chip from the packaging during the recycling process. The present invention provides a recyclable RFID device containing one or more recoverable components, a filtering system for recovering the recyclable RFID device, and a method for recovering the recyclable RFID device during waste recycling.

Figure 1:
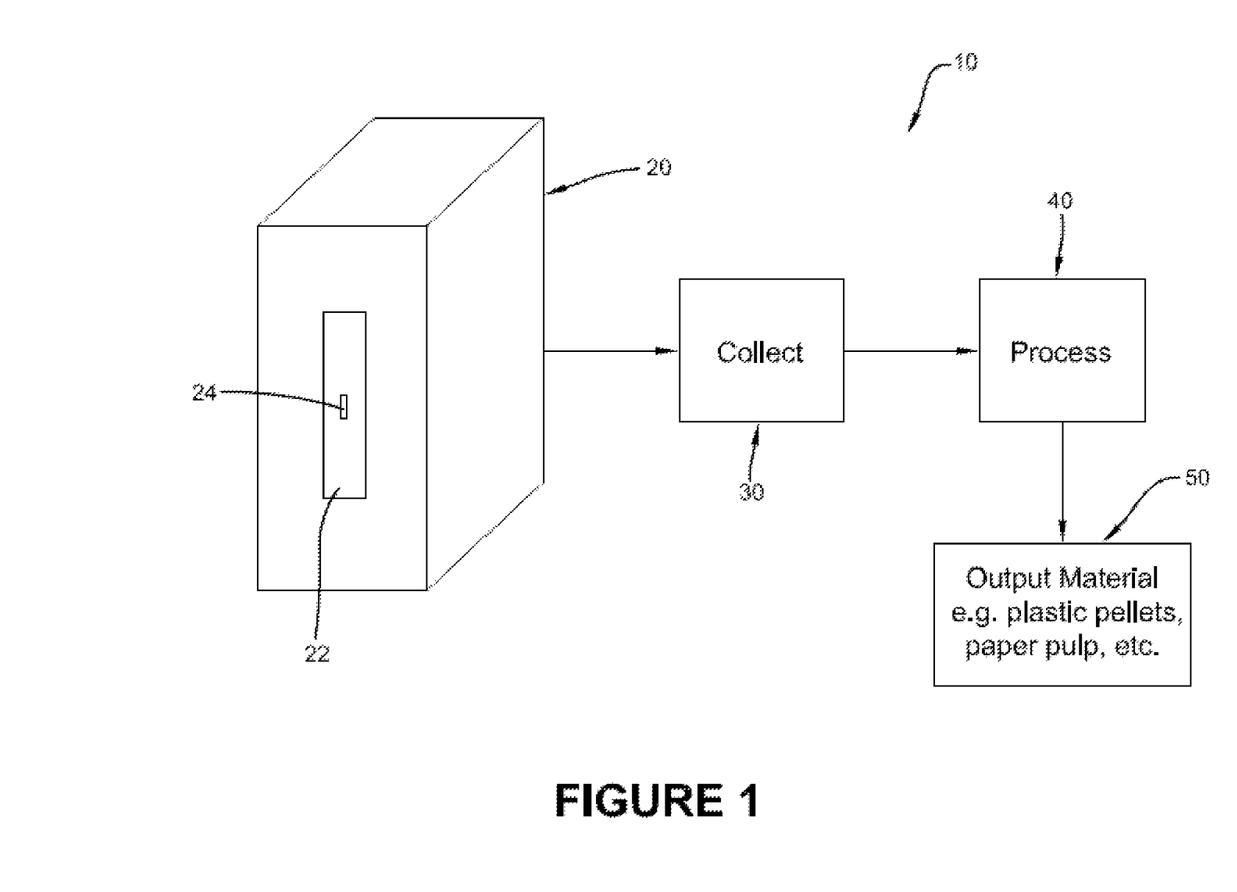
FIG. 1 illustrates a perspective view of a waste chain recycling process for a packaging with an RFID device attached thereto, wherein the RFID device is not recycled in accordance with the disclosed architecture.

Referring initially to the drawings, FIG. 1 illustrates a perspective view of a traditional waste chain recycling process 10 for recycling a packaging 20 having an RFID device 22 attached thereto, wherein the RFID device 22 is not recycled. The packaging 20 may be a box, container, packaging, product, or the like, with the RFID device 22 attached thereto for tracking the package 20 during its useful life. The RFID device 22 contains a RFID chip 24. At step 30, the packaging 20 with the attached RFID device 22 is collected for recycling. The packaging 20 with the attached RFID device 22 is then mechanically processed, such as by stirring, pulping, or other mechanical processes to break down the packaging 20, typically destroying or deactivating the RFID device 22 in the process at step 40. Then, at step 50, the processed packaging 20 is removed for repurposing as an output material, but is still contaminated with the RFID device 22. As previously stated, the presence of the RFID chip 24 reduces the value of the output material, or must be separately disposed of as a non-recyclable waste at an additional cost.

Figure 2:
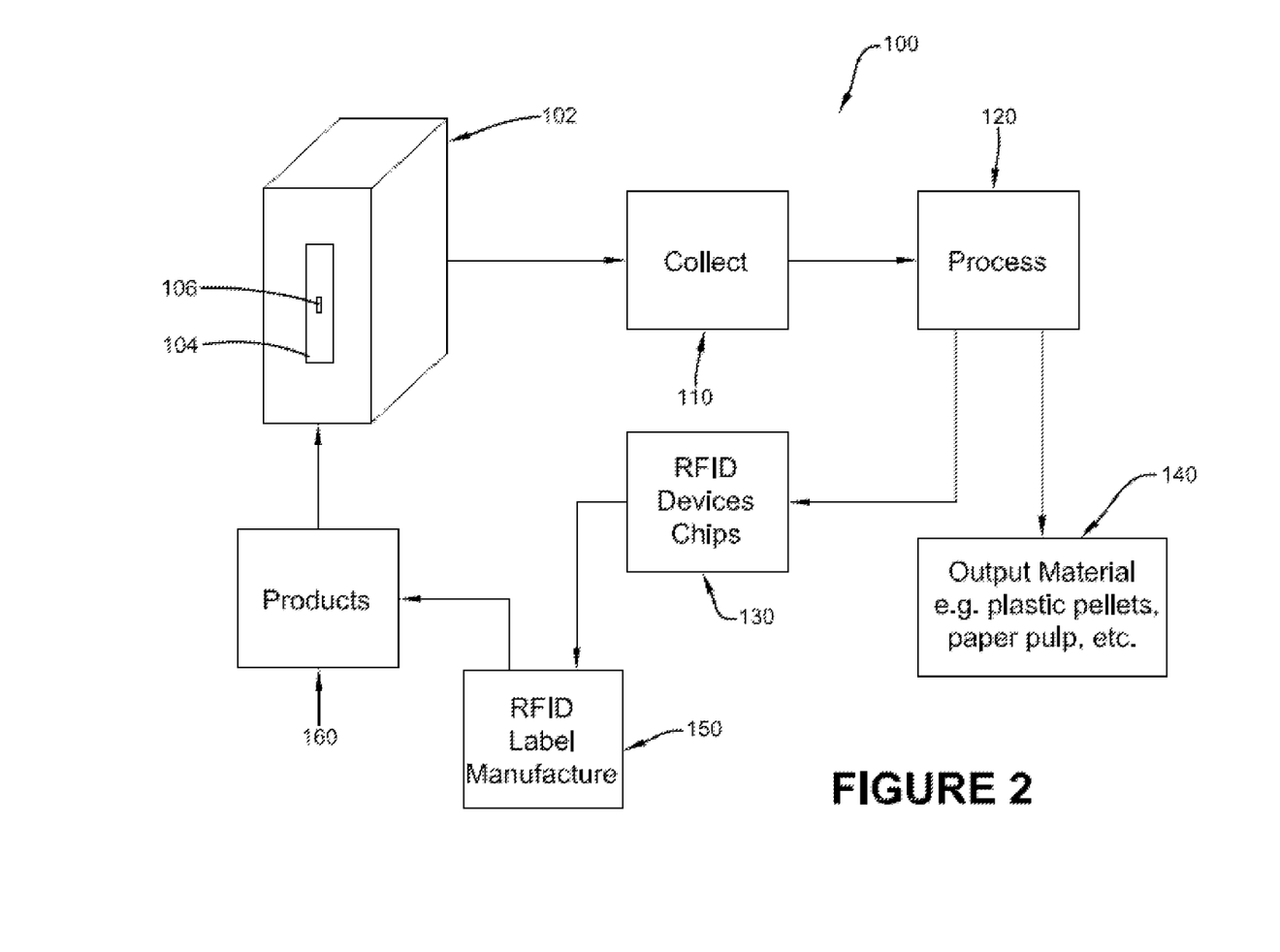
FIG. 2 illustrates a filtering system for recovering a recyclable RFID device that is attached to a packaging from a waste stream in accordance with the disclosed architecture.

FIG. 2 illustrates a filtering system 100 for recovering a recyclable RFID device that is attached to a packaging from a waste stream in accordance with the disclosed architecture. Packaging to be recycled 102 contains an RFID tag 104 containing RFID chip 106. The packaging 102 is sent to a collection area 110. The packaging to be recycled is cycled through a processing step or steps 120 to separate output material 140 from the RFID components 130, such as devices and chips. The RFID component can be sold to RFID label manufacturers for reuse as products 160.

Figure 3A:
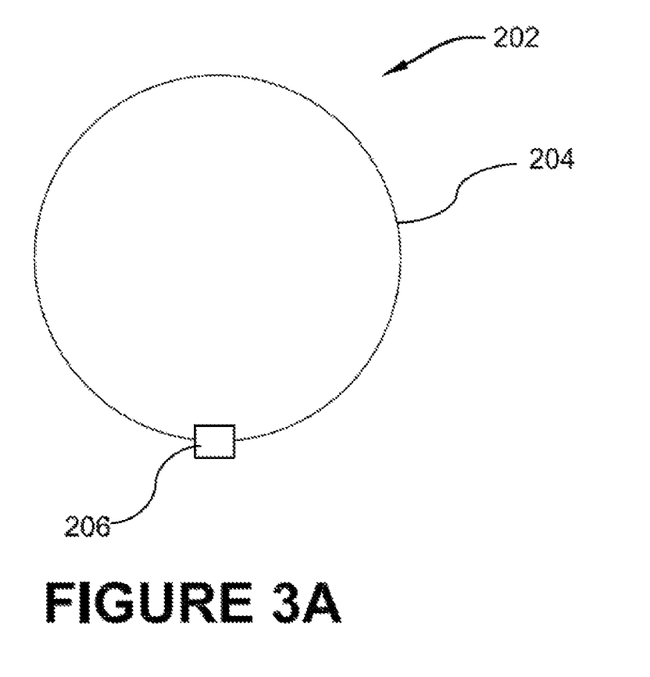
FIG. 3A illustrates a schematic view of a RFID coupling strap of a recyclable RFID device in accordance with the disclosed architecture.
Figure 3B:
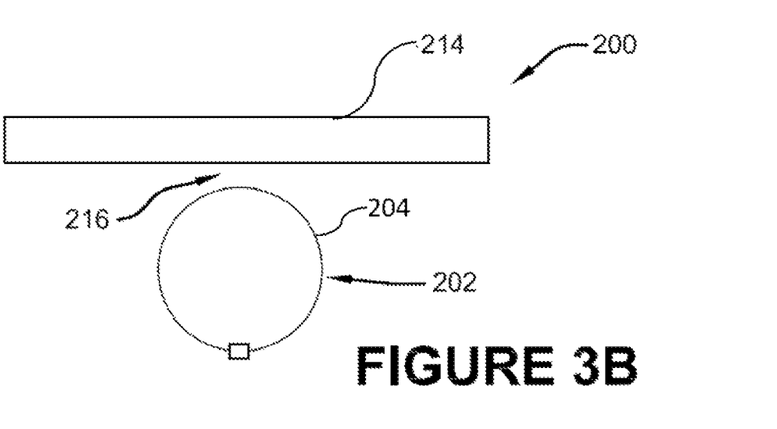
FIG. 3B illustrates a schematic view of the RFID coupling strap of FIG. 3A coupled to an antenna in accordance with the disclosed architecture.
Figure 3C:
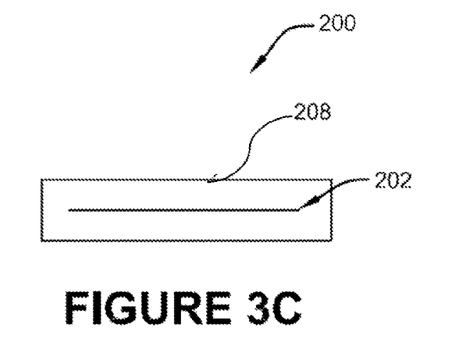
FIG. 3C illustrates a side view of a recyclable RFID device further containing a substrate encapsulating the RFID coupling strap of FIGS. 3A and 3B in accordance with the disclosed architecture.

FIGS. 3A-3C illustrate one embodiment of a recyclable RFID device 200 containing one or more recoverable components including a RFID coupling strap 202, wherein the coupling strap 202 contains a conductor 204 and a RFID chip 206. The RFID coupling strap 202 can be a near field magnetic strap, such as a H field strap, and the conductor 204 can be a loop conductor. The loop conductor 204 acts as an inductor which resonates with the RFID chip 206 capacitance at a desired frequency as shown in FIG. 3A. As best illustrated in FIG. 3C, the recyclable RFID device 200 further contains a substrate 208, that encapsulates the RFID coupling strap 202. The substrate 208 may be constructed as a pair of films, such as polyethylene terephthalate (PET) material films bonded together with an adhesive to prevent moisture ingress into the encapsulated RFID coupling strap 202, thereby forming a robust sealed package.

As best illustrated in FIG. 3B, the RFID coupling strap 202 of the recyclable RFID device 200 is placed near an antenna 214 forming a coupling 216 between the RFID coupling strap 202 and the antenna 214 to form a far field RFID device. As typical recycling processes use a mechanical motion, such as stirring or pulping, the RFID coupling strap 202 is dimensioned as small as possible. Therefore, the loop conductor 204 is preferably of minimal diameter with a line width associated with the loop conductor 204 being as small as possible to decrease the overall size of the RFID coupling strap 202 in an effort to decrease the likelihood of destruction of the coupling strap 204 from the mechanical motion of the recycling process.

Figure 4A:
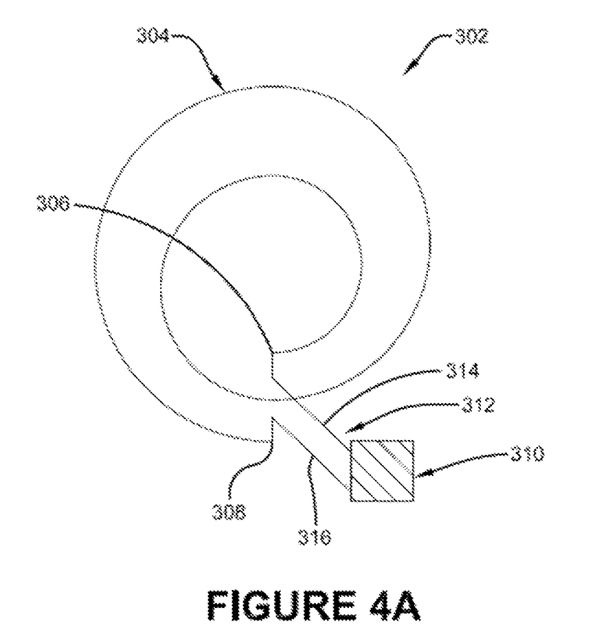
FIG. 4A illustrates a schematic view of a RFID coupling strap of a recyclable RFID device in accordance with the disclosed architecture.
Figure 4B:
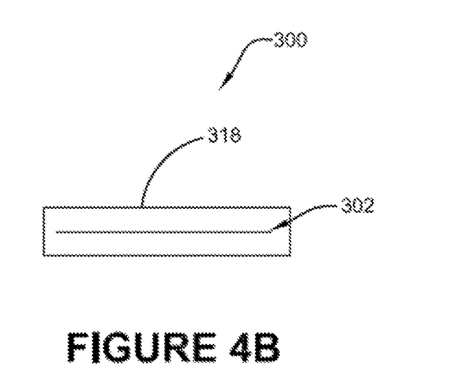
FIG. 4B illustrates a side view of the recyclable RFID device further containing a substrate encapsulating the RFID coupling strap of FIG. 4A in accordance with the disclosed architecture.

In an alternative embodiment as illustrated in FIGS. 4A and 4B, a recyclable RFID device 300 contains a RFID coupling strap 302, wherein the inductor has more than one turn. The RFID coupling strap 302 is typically a near field magnetic strap, such as a H field strap, and contains a conductor 304 and a RFID chip 310. The conductor 304 is a multi-turn coil conductor, as best illustrated in FIG. 4A, and contains an inner end 306 and an outer end 308. The multi-turn conductor 304 preferably has a reduced diameter compared to the loop conductor 204 of the previous embodiment, depicted in FIGS. 3A through 3C.

As is known in the art, multi-turn coils require that the RFID chip 310 be connected to both the inner and outer ends 306, 308 of the conductor 304. The turns of the multi-turn coil conductor 304 may be routed under the RFID chip 310 to achieve the connection between the inner end 306 and the outer end 308 of the multi-turn coil conductor 304 and the RFID chip 310. Alternatively, as illustrated in FIG. 4A, the RFID coupling strap 302 may further contain a bridge conductor component 312. The bridge conductor component 312 contains an inner end connection element 314, and an outer end connection element 316. The inner end connection element 314 is in electrical communication with both the inner end 306 of the multi-turn conductor coil 304 and the RFID chip 310, and the outer end connection element 316 is in electrical communication with both the outer end 308 of the multi-turn conductor coil 304 and the RFID chip 310, thereby connecting the multi-turn coil conductor 304 to the RFID chip 310.

The bridge conductor component 312 may be formed as part of a double sided etched process, or as an additive print of a conductive material, and the multi-turn coil conductor 304 may be manufactured from a metal, such as aluminum foil, or from a printed conductive ink. As best illustrated in FIG. 4B, the recyclable RFID device 300 further contains a substrate 318, and the RFID coupling strap 302 is encapsulated by the substrate 318. Thus, the recoverable component of the recyclable RFID device 300 contains the RFID coupling strap 302 attached with the RFID chip 310 (show in FIG. 4A) and encapsulated by the substrate 318.

Figure 5A:
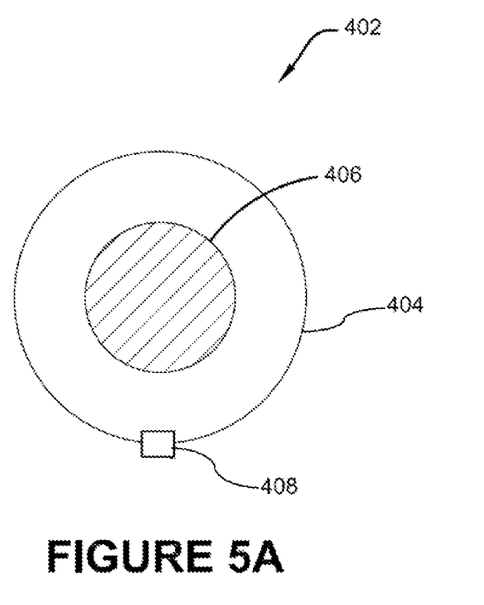
FIG. 5A illustrates a schematic view of a RFID coupling strap of a recyclable RFID device in accordance with the disclosed architecture.
Figure 5B:
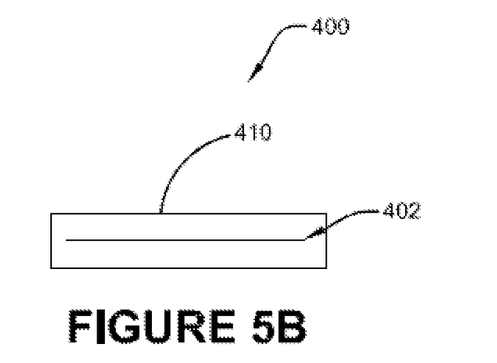
FIG. 5B illustrates a side view of the recyclable RFID device further containing a substrate encapsulating the RFID coupling strap of FIG. 5A in accordance with the disclosed architecture.

In a further alternative embodiment as illustrated in FIGS. 5A and 5B, a recyclable RFID device 400 contains a RFID coupling strap 402, and the RFID coupling strap 402 contains a conductor 404 and a RFID chip 408. The RFID coupling strap 402 is typically a near field magnetic strap, such as a H field strap, and the conductor 404 is preferably a loop conductor. The RFID coupling strap 402 further contains a high magnetic permeability element 406. The high magnetic permeability element 406 is preferably positioned within a central region of the loop conductor 404 so that the loop conductor 404 surrounds the high magnetic permeability element 406. This particular construction allows for a smaller H field RFID strap to be used, as the high magnetic permeability element 406 increases the coil inductance and allows for the loop conductor 404 to be smaller in diameter than in the previous embodiments. As illustrated in FIG. 5B, the recyclable RFID device 400 further contains a substrate 410, and the RFID coupling strap 402 is encapsulated by the substrate 410.

Figure 8A:
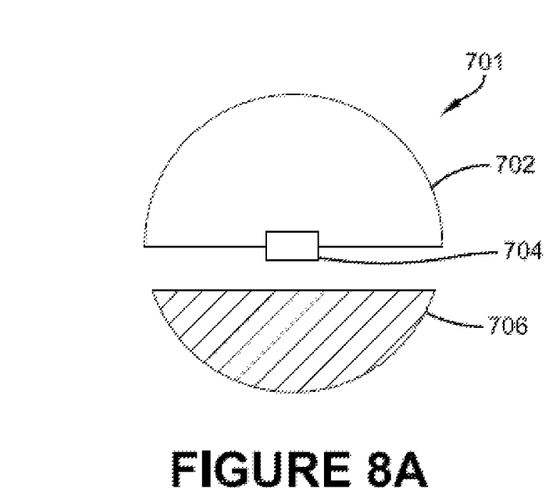
FIG. 8A illustrates a schematic view of a RFID coupling strap of a recyclable RFID device further containing a magnetic element in accordance with the disclosed architecture.
Figure 8B:
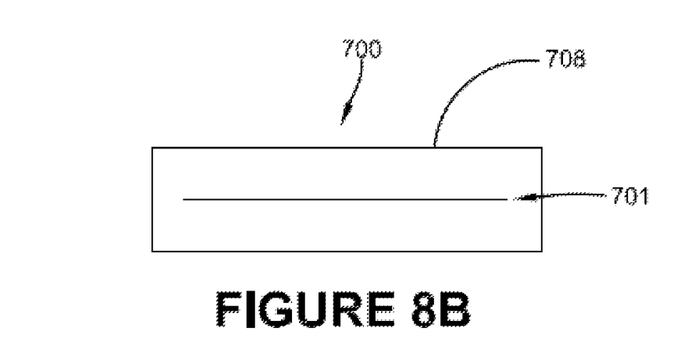
FIG. 8B illustrates a side view of the recyclable RFID device further containing a substrate encapsulating the RFID coupling strap and the magnetic element in accordance with the disclosed architecture.

In yet another alternative embodiment as illustrated in FIGS. 8A and 8B, a recyclable RFID device 700 contains a RFID coupling strap 701. The RFID coupling strap 701 comprises a conductor 702 and a RFID chip 704. The RFID coupling strap 701 is typically a near field magnetic strap, such as a H field strap. The RFID coupling strap 701 further contains a magnetic element 706, and the magnetic element 706 is manufactured from a magnetic material, such as steel.

The presence of the magnetic element 706 can be used to allow the recyclable RFID device 700 to be isolated and recovered using a magnetic field during a recycling operation, as discussed infra. As best illustrated in FIG. 8B, the recyclable RFID device 700 further contains a substrate 708, and the RFID coupling strap 701 is encapsulated by the substrate 708. In other embodiments, capacitive or conductive coupling can also be used to isolate and recover the RFID coupling strap including the RFID chip during recycling operations.

Figure 7A:
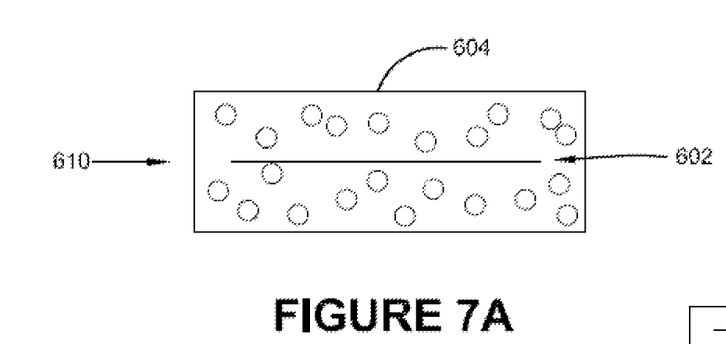
FIG. 7A illustrates a side view of the recyclable RFID device further containing the substrate encapsulating the RFID coupling strap in an uncompressed state in accordance with the disclosed architecture.
Figure 7B:
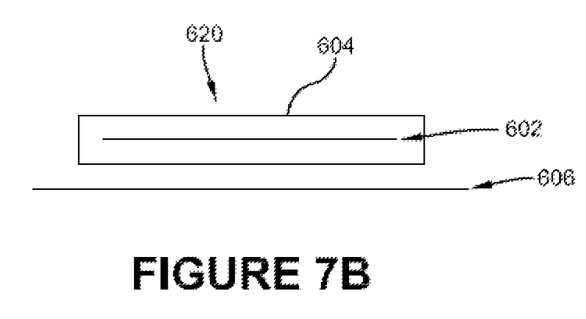
FIG. 7B illustrates a side view of the recyclable RFID device further containing the substrate encapsulating the RFID coupling strap in a compressed state in accordance with the disclosed architecture.
Figure 7C:
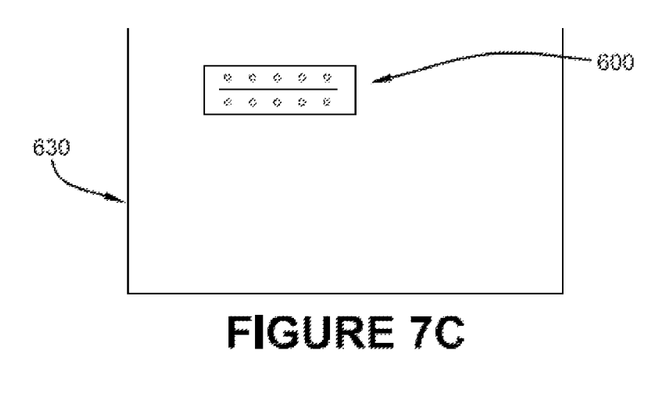
FIG. 7C illustrates a side view of the recyclable RFID device further containing the substrate encapsulating the RFID coupling strap returned to the uncompressed state in a waste collection container in accordance with the disclosed architecture.

In a further alternative embodiment as illustrated in FIGS. 7A through 7C, a recyclable RFID device 600 contains a RFID coupling strap 602 and a substrate 604. The RFID coupling strap 602 contains a conductor (not shown) and a RFID chip (also not shown) and is typically a near field magnetic strap, such as a H field strap. In use as illustrated in FIG. 7B, the RFID coupling strap 602 encapsulated by the substrate 604 is placed near an antenna 606 thereby forming a coupling between the RFID coupling strap 602 and the antenna 606 and a far field RFID device. More specifically, the substrate 604 may be constructed from two layers of a foam material bonded together with an adhesive to prevent moisture ingress into the encapsulated RFID coupling strap 602. As such, the relative density of the recyclable RFID device 600 would be less than water so that the recyclable RFID device 600 would float to the top of a tank 630 of water during a recycling operation, as best shown in FIG. 7C. Further, the substrate 604 is compressible. In an uncompressed state 610, the substrate foam is in its natural state. In a compressed state 620, the substrate foam is compressed as the RFID strap 602 is attached adjacent to the antenna 606 and held in the flat state by the structure of the recyclable RFID device 600 to minimize a visual "bump" from the recyclable RFID device 600 in the uncompressed state 610. The recyclable RFID device 600 returns to the uncompressed state 610 when the recyclable RFID device 600 is recycled.

Figure 6:
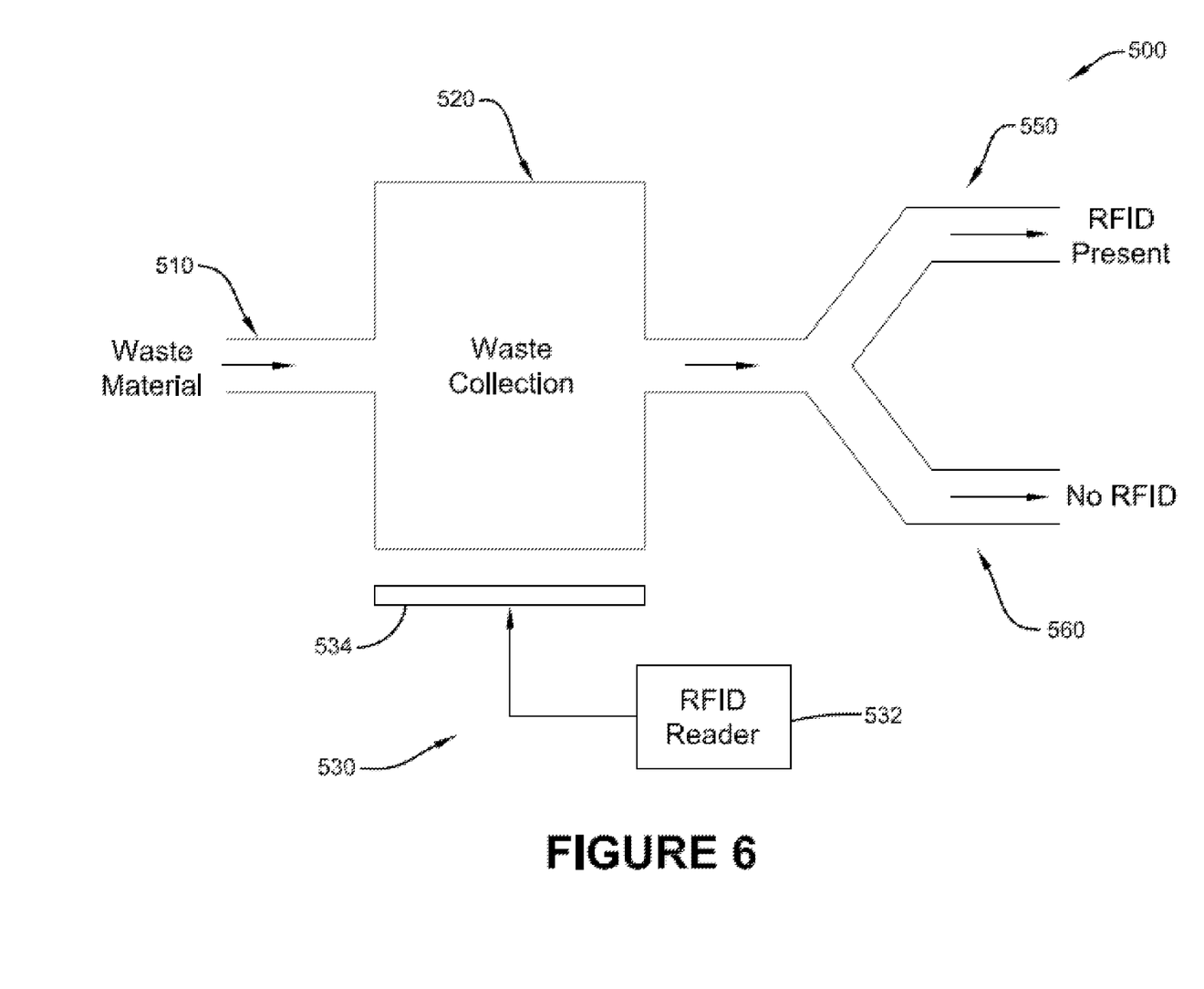
FIG. 6 illustrates a filtering system for recovering a recyclable RFID device attached to a packaging from a waste stream in accordance with the disclosed architecture.

In an embodiment as illustrated in FIG. 6, a filtering system 500 for recovering one or more recoverable components of a recyclable RFID device 200 (e.g., from FIGS. 3A through 3C) from a waste stream is provided. The filtering system 500 is designed to isolate the presence of RFID devices in a volume of the waste stream and separate that volume, thereby creating a secondary waste stream with a higher density of RFID devices per unit volume. As noted above, the recoverable components of the recyclable RFID device 200 preferably contains a RFID coupling strap 202 and a substrate 208. The coupling strap 202 further contains a conductor 204 and a RFID chip 206, all of which is preferably encapsulated within the substrate 208. Nonetheless, it is also contemplated that the RFID device being processed by the filtering system 500 may also be any of the prior described embodiments. Encapsulating only a strap portion of the recyclable RFID device enables securing a select portion of the recyclable RFID device which is most prone for damage, and thereby facilitating recovery of the same without any damage. Encapsulating only a portion of recyclable RFID device, without encapsulating the entire RFID device not only ensures optimal usage of material but also ensures that the size of the recyclable RFID device is compact. Compact RFID devices can be easily recycled. Large sized RFID devices on the other hand are likely to jam filtering systems.

As best shown in FIG. 6, the filtering system 500 contains a primary waste input 510, a waste collection container 520, and a RFID device detection unit 530. The primary waste input 510 is where a packaging 102 having an attached RFID tag 104 and an RFID chip 106 (such as that shown in FIG. 2) enters the waste collection container 520 and is exposed to the RFID device detection unit 530. The recyclable RFID device detection unit 530 contains a RFID reader 532 coupled to a reader antenna 534, typically a near field antenna. Alternatively, the recyclable RFID device detection unit 530 may be in the form of a harmonic detector (not shown). The filtering system 500 further contains a RFID device diversion area 550 and a secondary waste output 560 to receive the output of the waste collection container 520, as best shown in FIG. 6.

More specifically, the filtering system 500 uses the RFID reader 532 coupled to a known area of the waste stream (e.g., a pipe), and a method of selectively diverting some of the waste stream. Depending on the nature of the waste stream, different types of antennas and coupling to the RFID device can be used. For example, when employing a liquid carrier such as water, a H near field reader antenna would be most suitable. By comparison, when employing a shredded material on a conveyer, a far field antenna may be more suitable or adequate.

Figure 8C:
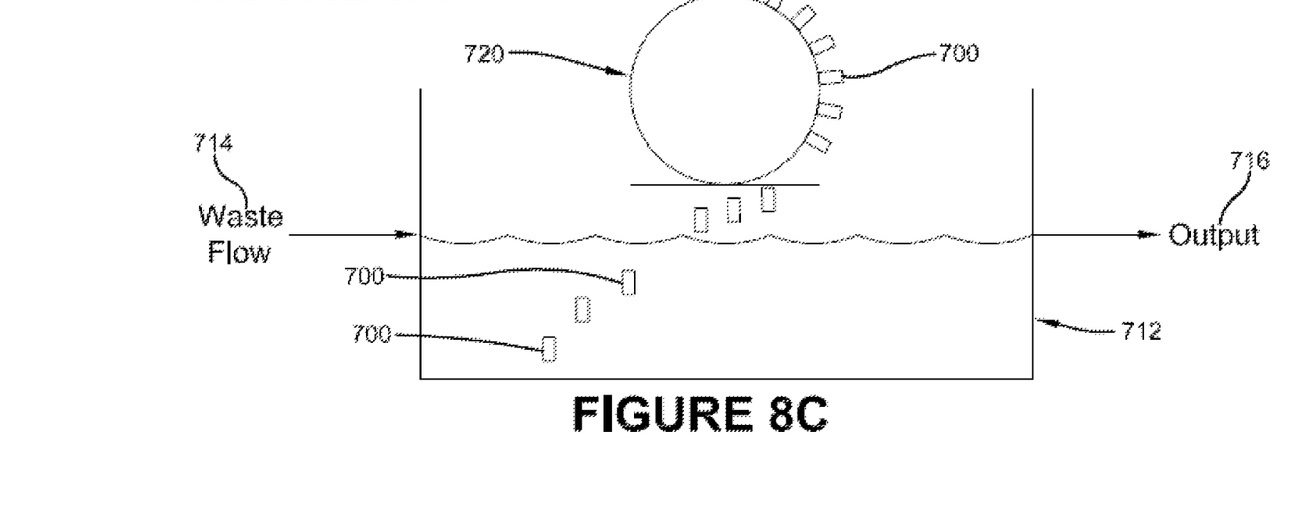
FIG. 8C illustrates a side view of the recyclable RFID device being removed from a waste collection container of a filtering system via a recyclable RFID device removal component in accordance with the disclosed architecture.

In one embodiment and as best illustrated in FIG. 8C, the waste collection container 520 may be a float tank 712 comprising an input 714 and an output 716. The filtering system 500 may further contain a recyclable RFID device removal unit 720. The recyclable RFID device removal unit 720 can be used with the recyclable RFID device 700 containing the magnetic element 706 (shown in FIG. 8A). More specifically, the recyclable RFID device removal unit 720 uses a magnetic field to attract the recyclable RFID device 700 from the float tank 712, thereby separating and recovering the recyclable RFID devices 700 from any other waste during the recycling process. However, in other embodiments, capacitive or conductive coupling can also be used to attract the recyclable RFID device 700 from the float tank 712.

In an alternative embodiment illustrated in FIGS. 2 and 6, a method 100 for recovering one or more recoverable components of a recyclable RFID device 104 including an RFID chip 106 during a waste recycling process is provided. More specifically, a waste stream comprising a packaging 102 with the recyclable RFID device 104 attached to the packaging 102 is received as a primary waste input 510, as shown in FIG. 6. At step 110, the waste stream is collected, and enters a waste collection container 520, such as that shown in FIG. 6. At step 120, the recyclable RFID device 104 is separated from the packaging 102, via a process typically involving a mechanical motion, such as stirring or pulping. As discussed above, the recyclable RFID device 104 is preferably configured to be removable from the packaging 102 substantially intact and without damage to the RFID coupling strap. The encapsulation of the RFID coupling strap by the substrate ensures that there is no damage to the coupling strap and to the RFID chip attached thereto, especially when the recyclable RFID device is subject to mechanical motions such as stirring or pulping. Thus, the one or more recoverable components of the recyclable RFID device are separated from the packaging. In the present embodiment, the antenna 214 (shown in FIG. 3B) of the recyclable RFID device made of recyclable material such as Aluminum or graphene is recycled along with the packaging 102, while the RFID coupling strap 202 made of non-recyclable material is separated from the packaging material 102.

At step 130, the RFID coupling strap 202 (shown in FIG. 3A) containing the RFID chip that is separated from the packaging 102 is detected using a RFID detector 530, such as the one illustrated in FIG. 6, and selectively diverted from the waste stream to a RFID device diverting area 550. As illustrated in FIG. 8C, the separated recyclable RFID device 104 including the RFID coupling strap 202 (shown in FIG. 3A) may be selectively diverted from the waste stream magnetically using a RFID device removal component 720 that employs a magnetic field. Once removed at step 130, the removed or recovered component of the recyclable RFID device 104 may proceed to a RFID label manufacturer for repurposing and be attached to new packaging at step 160. Additionally, at step 140, the non-RFID waste material is diverted to a secondary waste output 560 for further recycling, and its value has not been diminished by the presence of RFID device 104 or its various components as discussed supra.

In the preferred waste chain, the RFID chips are recovered at the recycle stage and returned to the RFID label manufacturer for reuse. This reuse prevents the RFID labels from being included in and contaminating the other recyclable materials from the products or packaging. The recycling facility may, in turn, sell the recovered RFID devices at a lower cost than new RFID components to the label manufacturer. This makes it cost effective to recycle the overall material, hence increasing overall recycling rates and manufacturing efficiencies.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for recovering a recyclable radio-frequency identification (RFID) device from a waste stream, the system comprising:
    the recyclable RFID device comprising one or more small recoverable components including an RFID coupling strap comprising a conductor and an RFID chip both encapsulated within a substrate; and a filtering system comprising:
    a waste collection container configured to separate the recyclable RFID device from an associated packaging within the container;
    an RFID device detection unit configured to detect the separated recyclable RFID device including the RFID coupling strap; and
    an RFID device diversion area.

2. The system of claim 1, wherein the waste collection container is a float tank.

3. The system of claim 1, wherein the RFID device detection unit comprises a RFID reader having a reader antenna.

4. The system of claim 1, wherein the filtering system further comprises a RFID device removal unit.

5. The system of claim 1, wherein the filtering system comprises an RFID device removal unit configured to remove the RFID coupling strap detected by the RFID device detection unit from the waste stream.

6. The system of claim 1, wherein the filtering system is configured to selectively divert the RFID coupling strap removed from the waste stream to the RFID device diversion area for recovery and reuse.

7. The system of claim 1, wherein the filtering system is configured to selectively divert the RFID coupling strap from the waste stream magnetically.

8. A method for recovering one or more recoverable components of a recyclable radio-frequency identification (RFID) device using a filtering system, the recoverable components including an RFID coupling strap comprising a conductor and an RFID chip both encapsulated within a substrate, the method comprising the steps of:

allowing a primary waste input comprising the recyclable RFID device attached to an associated packaging to enter a waste collection container of the filtering system;

separating the recyclable RFID device from the associated packaging within the waste collection container;

exposing the separated recyclable RFID device comprising the recoverable components thereof to a RFID device detection unit of the filtering system and detecting the separated recoverable components from the primary waste input, wherein the RFID detection unit is configured to detect the separated recyclable RFID device including the RFID coupling strap; and removing the detected recoverable components of the recyclable RFID device through a RFID device removal unit of the filtering system.

9. The method of claim 8, wherein the recoverable components removed by the RFID device removal unit are selectively diverted to a RFID device diversion area for recovery and reuse.

10. The method of claim 8, wherein the RFID coupling strap is removed from the primary waste input and diverted magnetically using the RFID device removal unit.

\* \* \* \* \*